(12) United States Patent
Brinkmann, Jr. et al.

(10) Patent No.: US 6,581,130 B1
(45) Date of Patent: Jun. 17, 2003

(54) DYNAMIC REMAPPING OF ADDRESS REGISTERS FOR ADDRESS TRANSLATION BETWEEN MULTIPLE BUSSES

(75) Inventors: Hubert E. Brinkmann, Jr., Spring, TX (US); Ryan A. Callison, Spring, TX (US)

(73) Assignee: Hewlett Packard Development Company, L.P., Ft. Collins, CO (US)

( * ) Notice: Subject to any disclaimer, the term of this patent is extended or adjusted under 35 U.S.C. 154(b) by 0 days.

(21) Appl. No.: 09/542,420

(22) Filed: Apr. 4, 2000

(51) Int. Cl.$^7$ .......................... G06F 13/36; G06F 12/00; G06F 12/02; G06F 12/04; G06F 12/08
(52) U.S. Cl. ....................... 710/306; 711/202; 711/206; 711/209
(58) Field of Search ................................ 710/306, 3, 4, 710/313–315; 711/211, 212, 202–209

(56) References Cited

U.S. PATENT DOCUMENTS

| | | | | |
|---|---|---|---|---|
| 5,386,538 A | * | 1/1995 | Nye | 711/3 |
| 5,634,013 A | * | 5/1997 | Childers et al. | 710/100 |
| 5,640,528 A | * | 6/1997 | Harney et al. | 711/201 |
| 5,649,142 A | * | 7/1997 | Lavelle et al. | 711/202 |
| 5,664,117 A | * | 9/1997 | Shah et al. | 370/402 |
| 5,682,512 A | * | 10/1997 | Tetrick | 345/974 |
| 5,692,200 A | | 11/1997 | Carlson et al. | |
| 5,721,839 A | | 2/1998 | Callison et al. | |
| 5,734,847 A | * | 3/1998 | Garbus et al. | 710/1 |
| 5,771,359 A | | 6/1998 | Galloway et al. | |
| 5,838,932 A | | 11/1998 | Alzien | |
| 5,894,563 A | * | 4/1999 | Saperstein | 710/305 |
| 5,918,026 A | | 6/1999 | Melo et al. | |
| 5,953,511 A | * | 9/1999 | Sescila et al. | 710/315 |
| 6,098,113 A | * | 8/2000 | Heil et al. | 710/1 |
| 6,105,146 A | * | 8/2000 | Tavallaei et al. | 714/1 |
| 6,154,824 A | * | 11/2000 | Robertson et al. | 711/202 |
| 6,324,609 B1 | * | 11/2001 | Davis et al. | 710/119 |
| 6,353,877 B1 | * | 3/2002 | Duncan et al. | 710/306 |
| 6,356,991 B1 | * | 3/2002 | Bauman et al. | 711/209 |

OTHER PUBLICATIONS

Intel® 21050 PCI–to–PCI Bridge Evaluation Board User's Guide, Sep. 1998, © Intel Corporation 1998, pp. i–iv, 1–1–3–2.
PCI Local Bus Specification, Revision 2.2, Dec. 1998, ©1992, 1993, 1995, 1998 PCI Special Interest Group, pp. i–ii, 201–204.
Tom Shanley and Don Anderson, PCI System Architecture, Third Edition, ©1995 MindShare, Inc., Chapter 19:PCI–to–PCI Bridge, pp. 381–455.
PCI Local Bus, PCI to PCI Bridge Architecture Specification, Revision 1.0, Apr. 1994, pp. i–iii, 1–66.
PCI Local Bus, PCI–to–PCI Bridge Architecture Specification, Revision 1.1, Dec. 1998, ©1994, 1998, PCI Special Interest Group, pp. 1–2, 11–13, 46–47, 57–66, 69–70.
PCI Local Bus, PCI–X Addendum to the PCI Local Bus Specification, Revision 1.0, Sep. 1999, ©1999 PCI Special Interest Group, pp. 1–2, 34–37, 40–41, 93–95, 146–147.

* cited by examiner

*Primary Examiner*—Glenn A. Auve
*Assistant Examiner*—Trisha Vu
(74) *Attorney, Agent, or Firm*—Fletcher, Yoder & Van Someren

(57) ABSTRACT

Address translation between various peripheral bus interfaces is provided through a bus interface device. Specifically, the bus interface device translates incoming transactions from a source bus interface to a different address or location within a destination bus interface. Flexibility for communications between multiple bus interfaces having different, possibly conflicting, address spaces is ensured by allowing the internal translation registers to be dynamically reprogrammed. Reprogramming of the translation registers may occur during runtime bus operations. These registers define translation windows within which a transaction will be claimed and translated to the destination bus interface. Translation is accomplished using the translation registers to identify portions of the incoming received address which should not be translated because those portions contain the information to be communicated. At the same time, portions identifying only the location of the information are translated to identify a different location within the destination address space.

24 Claims, 10 Drawing Sheets

| 3 | 2 | 1 | 0 | Memory Offset | Config Offset |
|---|---|---|---|---|---|
| P_PCI_LIM_1[31:20] | | P_PCI_BASE_1[31:20] | | 320 | 20 |
| P_PCI_LIM_3[31:20] | | P_PCI_BASE_3[31:20] | | 324 | 24 |
| P_PCI_BASE_3[63:32] | | | | 328 | 28 |
| P_PCI_LIM[63:32] | | | | 32C | 2C |
| P_PCI_SIZE_2[31:20] | | P_PCI_BASE_2[31:20] | | 360 | 60 |
| P_PCI_LIM_4[31:20] | | P_PCI_BASE_4[31:20] | | 364 | 64 |
| P_PCI_BASE_4[63:32] | | | | 368 | 68 |
| S_PCI_LIM_1[31:20] | | S_PCI_BASE_1[31:20] | | 36C | 6C |
| S_PCI_SIZE_2[31:20] | | S_PCI_BASE_2[31:20] | | 370 | 70 |
| S_PCI_LIM_3[31:20] | | S_PCI_BASE_3[31:20] | | 374 | 74 |
| S_PCI_BASE_3[63:32] | | | | 378 | 78 |
| S_PCI_LIM_3[63:32] | | | | 37C | 7C |
| S_PCI_LIM_4[31:20] | | S_PCI_BASE_4[31:20] | | 380 | 80 |
| S_PCI_BASE_4[63:32] | | | | 384 | 84 |
| S_PCI_TADR_1[31:20] | | P_PCI_TADR_1[31:20] | | 388 | 88 |
| S_PCI_TADR_2[31:20] | | P_PCI_TADR_2[31:20] | | 38C | 8C |
| P_PCI_TADR_2[63:32] | | | | 390 | 90 |
| S_PCI_TADR_2[63:32] | | | | 394 | 94 |
| S_PCI_TADR_3[31:20] | | P_PCI_TADR_3[31:20] | | 398 | 98 |
| P_PCI_TADR_3[63:32] | | | | 39C | 9C |
| S_PCI_TADR_3[63:32] | | | | 3A0 | A0 |
| S_DRAM_TADR_1[31:20] | | P_DRAM_TADR_1[31:20] | | 3A4 | A4 |
| S_DRAM_TADR_2[31:20] | | P_DRAM_TADR_2[31:20] | | 3A8 | A8 |
| P_DRAM_SIZE_1[31:20] | | P_DRAM_BASE_1[31:20] | | 3AC | AC |
| P_DRAM_LIM_2[31:20] | | P_DRAM_BASE_2[31:20] | | 3B0 | B0 |
| P_DRAM_SIZE_3[34:20] | | P_DRAM_BASE_3[31:20] | | 3B4 | B4 |
| P_DRAM_BASE_3[63:32] | | | | 3B8 | B8 |
| S_DRAM_SIZE_1[31:20] | | S_DRAM_BASE_1[31:20] | | 3BC | BC |
| S_DRAM_LIM_2[31:20] | | S_DRAM_BASE_2[31:20] | | 3C0 | C0 |
| S_DRAM_SIZE_3[34:20] | | S_DRAM_BASE_3[31:20] | | 3C4 | C4 |
| S_DRAM_BASE_3[63:32] | | | | 3C8 | C8 |

SIZE REGISTER

| Value Register Values | PCI 2 Memory Range Size (1 MB = 1024000 bytes) |
|---|---|
| 0x0000 | 0 MB |
| 0xFFF0 | 1 MB |
| 0xFFE0 | 2 MB |
| 0xFFC0 | 4 MB |
| 0xFF80 | 8 MB |
| 0xFF00 | 16 MB |
| 0xFE00 | 32 MB |
| 0xFC00 | 64 MB |
| 0xF800 | 128 MB |
| 0xF000 | 256 MB |
| 0xE000 | 512 MB |
| 0xC000 | 1024 MB |
| 0x8000 | 2048 MB |

FIGURE 7A

| Example (Size register) | | |
|---|---|---|
| | | Register values |
| Address | 70h → S_PCI_SIZE_2[31:20]/S_PCI_BASE_2[31:20] | FFF0 E6F0 |
| Address | 8Ch → S_PCI_TADR_2[31:20] | 5A70 |
| Address | 94h → S_PCI-TADR_2[63:32] | 8A7C F93D |
| | | Addresses on bus |
| Secondary PCI bus address | | E6FA 5C6E |
| Primary PCI bus (translated) address | | 8A7C F93D 5A7A 5C6E |

Example (Limit register)

| | | Register values |
|---|---|---|
| Address | 74h → S_PCI_LIM_3[31:20]/S_PCI_BASE_3[31:20] | 1280 1200 |
| Address | 78h → S_PCI_BASE_3[63:32] | 8953 CABD |
| Address | 7Ch → S_PCI-LIM_3[63:32] | 8953 CABD |
| Address | 98h →S_PCI_TADR_3[31:20] | A500 |
| Address | A0h →S_PCI_TADR_3[63:32] | A5A5 A5A5 |

| | Full Address / Limit |
|---|---|
| S_PCI_BASE_3[63:20] | 8953 CABD 1200 0000 |
| S_PCI_LIM_3[63:20] | 8953 CABD 1280 0000 |
| S_PCI_TADR_3[63:20] | A5A5 A5A5 A500 0000 |

| | Addresses on bus |
|---|---|
| Secondary PCI bus address | 8953 CABD 126C 1B04 |
| Primary PCI bus (translated) address | A5A5 A5A5 A56C 1B04 |

Figure 8B

| bit number | 63 62 61 60 59 58 57 56 55 54 53 52 51 50 49 48 47 46 45 44 43 42 41 40 39 38 37 36 35 34 33 32 31 30 29 28 27 26 25 24 23 22 21 20 19 18 17 16 15 14 13 12 11 10 9 8 7 6 5 4 3 2 1 0 |
|---|---|
| EXAMPLE 4 (LIMIT) | |
| secondary PCI adr (hex value) | 8 9 5 3 c a b d 1 2 6 c 1 b 0 <br> \|1 0 0 0\|1 0 0 1\|0 1 0 1\|0 0 1 1\|1 1 0 0\|1 0 1 0\|1 0 1 1\|1 1 0 1\|0 0 0 1\|0 0 1 0\|0 1 1 0\|1 1 0 0\|0 0 0 1\|1 0 1 1\|0 0 0 0\|0 1 0 0\| |
| S_PCI_LIM_3 | \|1 0 0 0\|1 0 0 1\|0 1 0 1\|0 0 1 1\|1 1 0 0\|1 0 1 0\|1 0 1 1\|1 1 0 1\|0 0 0 1\|0 0 1 0\|1 0 0 0\|0 0 0 0\| — — — |
| S_PCI_BASE_3 | \|1 0 0 0\|1 0 0 1\|0 1 0 1\|0 0 1 1\|1 1 0 0\|1 0 1 0\|1 0 1 1\|1 1 0 1\|0 0 0 1\|0 0 1 0\|0 0 0 0\|0 0 0 0\| — — — |
| S_PCI_TADR_3 | \|1 0 1 0\|0 1 0 1\|0 1 0 1\|1 0 1 0\|1 0 1 0\|1 0 1 0\|0 1 0 1\|0 1 0 1\|1 0 1 0\|0 1 0 1\|0 0 0 0\|0 0 0 0\| — — — |
| | |
| Primary PCI adr(transl) | \|1 0 1 0\|0 1 0 1\|0 1 0 1\|1 0 1 0\|1 0 1 0\|1 0 1 0\|0 1 0 1\|0 1 0 1\|1 0 1 0\|0 1 0 1\|0 1 1 0\|1 1 0 0\|0 0 0 1\|1 0 1 1\|0 0 0 0\|0 1 0 0\| | ns
DYNAMIC REMAPPING OF ADDRESS REGISTERS FOR ADDRESS TRANSLATION BETWEEN MULTIPLE BUSSES

RELATED APPLICATIONS

This application is related to co-pending, concurrently filed, and commonly assigned U.S. Patent Applications which are hereby incorporated by reference as if set forth in their entirety:

U.S. patent application Ser. No. 09/542,760, entitled MEMORY INTERFACE CONTROLLER FOR DATUM RAID OPERATIONS WITH A DATUM MULTIPLIER, filed concurrently by Ryan A. Callison, Christopher Garza, Albert H. Chang, and Hubert E. Brinkmann, Jr.;

U.S. patent application Ser. No. 09/542,624, entitled RAID XOR OPERATIONS TO SYNCHRONOUS DRAM USING A READ BUFFER, filed concurrently by Ryan A. Callison, William C. Galloway, Christopher Garza, and Albert H. Chang;

U.S. patent application Ser. No. 09/542,309, entitled DYNAMIC ROUTING OF DATA ACROSS MULTIPLE DATA PATHS FROM A SOURCE CONTROLLER TO A DESTINATION CONTROLLER, filed concurrently by Hubert E. Brinkimann, Jr. and Ryan A. Callison;

U.S. patent application Ser. No. 09/542,989, entitled PROVIDING DATA IN RESPONSE TO A READ COMMAND THAT MAINTAINS CACHE-LINE ALIGNMENT, filed concurrently by Jeff Carlson and Ryan A. Callison;

U.S. patent application Ser. No. 09/542,157, entitled DISCONNECTING A DEVICE ON A CACHE-LINE BOUNDARY IN RESPONSE TO A WRITE COMMAND, filed concurrently by Jeff Carlson and Ryan A. Callison.

BACKGROUND OF THE INVENTION

1. Field of the Invention

The invention relates to internal computer communications, and more particularly to bridge devices in multicontroller computer applications.

2. Description of the Related Art

Bridge devices, such as a PCI-to-PCI (peripheral component interconnect) bridge, have traditionally allowed only flow or pass through functionality with respect to communications from one bus interface to another bus interface. Transactions between different bus interfaces, therefore, have been restrictive requiring the different interfaces to have similar if not exact defined address spaces. Alternatively, differences in address spaces have resulted in operation intensive address conflict resolution algorithms. Conflicts are further acerbated in multi-interface applications where one of the multiple interfaces is a memory interface. Specifically multi-conflict resolution has been required between a first and second interface to a memory interface.

One approach has been to configure address spaces to intersect at portions of address space where it can be estimated high traffic between communicating devices will occur. In addition, bridge devices have been configured to translate an incoming address from one known address space to a different but known second address space. However, this translation has been restricted to only predefined translations without runtime flexibility.

SUMMARY OF THE INVENTION

Dynamic address translation among multiple computer bus interfaces is provided through a number of configuration registers. A translation window is established at an initiating or host bus interface using a first set of configuration registers. A base register is programmed to indicate the beginning address of the translation window. Another corresponding register is programmed to set the size of the translation window extending from the beginning address. A transaction occurring on the initiating bus side that falls within the translation window is first claimed by the translation device. If translation is enabled, the translation device distinguishes the portion of the initiating transaction that defines the contents of the information within the translation window and passes that information without translation. The remaining portion of the transaction is translated into a different region at the receiving or local bus interface. The configuration registers may be dynamically remapped during runtime by any communicating master device to translate from a region at one bus interface to a different region at another bus interface.

BRIEF DESCRIPTION OF THE DRAWINGS

A better understanding of the present invention can be obtained when the following detailed description of the preferred embodiment is considered in conjunction with the following drawings, in which:

FIG. 5 is a register map showing configuration registers used in the translation method shown in FIG. 4;

FIG. 6 is a chart illustrating the address window sizes from the configuration registers show in FIG. 5;

FIGS. 7A and 7B provide an exemplary address translation using size registers; and FIGS. 8A and 8B illustrate an example of address translation using limit registers.

DETAILED DESCRIPTION OF THE PREFERRED EMBODIMENT

Figure 1:
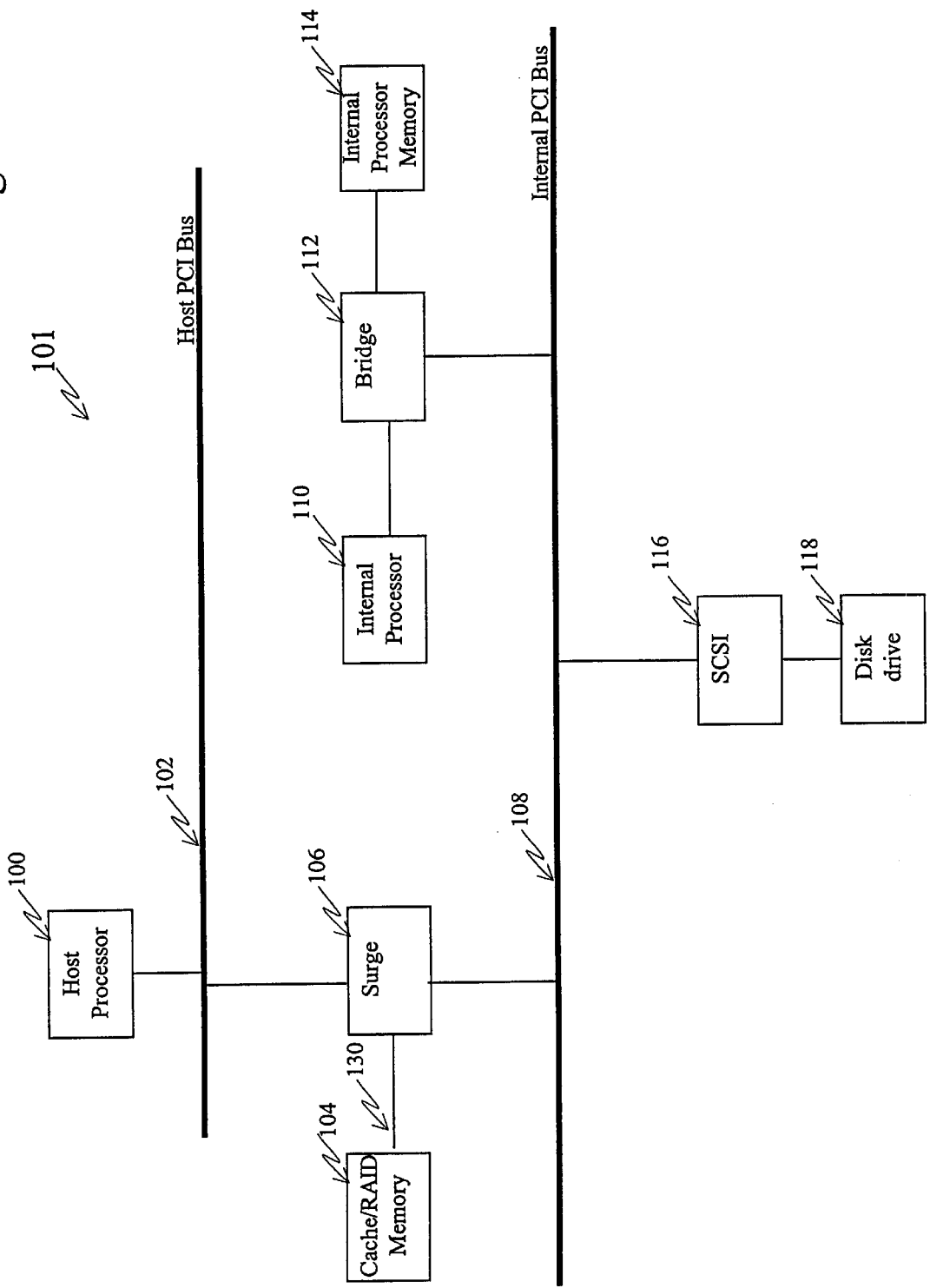
FIG. 1 is a block diagram of the computer system having a bus interface device in accordance with the present invention.

Referring now to FIG. 1, a block diagram of a disk subsystem 101 is shown. A Host Processor 100 is connected to a host PCI (Peripheral Component Interconnect) bus 102, which provides a communications channel to other components of a host computer system (not shown). The disk subsystem 101 also includes an internal PCI bus 108, which, like the host PCI bus 102, includes a control portion and a multiplexed address and data portion. Both buses 102 and 108 are capable of 66 MHz and 64-bit operation. For a description of the PCI bus standard, refer to *PCI Specification, Revision* 2.2, (December 1998), Intel Corporation of Santa Clara, Calif., which is hereby incorporated by reference as if set forth in its entirety.

Coupled to the internal PCI bus 108 is an internal or local processor 110 that controls the functions of the devices coupled to the internal PCI bus 108, for example. The Internal Processor 110 is coupled to an Internal Processor memory 114. Both the Internal Processor 110 and the Internal Processor memory 114 are coupled through a processor PCI bridge 112 to the internal PCI bus 108. The Internal Processor 110 executes firmware stored in the Internal Processor memory 114 to perform various disk controller functions.

The processor PCI bridge 112 can be implemented with an ASIC. Further, the processor PCI bridge 112 can include logic for converting processor memory or I/O cycles into PCI cycles, and as well can include processor-to-PCI write posting buffers. The processor-PCI bridge 112 also can include a memory controller for controlling operations to the Internal Processor memory 114. Additionally, interval timers and an interrupt controller are included in the processor-PCI bridge 112.

Also connected to the internal PCI bus 108 is at least one SCSI controller 116 for interfacing with a disk drive 118. Multiple SCSI controllers and associated disk drives may be added to create a disk array subsystem.

Transactions between the host PCI bus 102 and the internal PCI bus 108 are bridged by a bus/memory interface device 106. The bus/memory interface device 106 has at least two modes of operation. In one mode, the bus/memory interface device 106 operates as a "pass-through" or PCI-to-PCI bridge device, directly passing transactions between the host PCI bus 102 and the internal PCI bus 108. The bus/memory interface device 106 also operates in a non-bridge mode, whereby transactions between the host PCI bus 102 and the internal PCI bus 108 are first translated by the bus/memory interface device 106 before being sent to their destination.

In the non-bridge mode, the bus/memory interface device 106 provides address and data translation between two or more bus interfaces, specifically between buses having non-matching address spaces. Where a conflict exists between an address in the address space for the Internal Processor 110 or the internal PCI bus 108 and an address in the address space for the Host Processor 100 or the host PCI bus 102, the bus/memory interface device 106, in the non-bridge mode, remaps the incoming transaction and translates the address originating from the originating bus into a different, but corresponding, outgoing address within the address space of the receiving or destination bus. Additionally, the bus/memory interface device 106 performs its address translations in a bi-directional manner. For example, a request issued by the Host Processor 100 passes from the host PCI bus 102 in the host PCI address space to the bus/memory interface device 106. The incoming address is then translated to the appropriate corresponding address within the address space of the internal PCI bus 108. Likewise, the Internal Processor 110 communicates with the Host Processor 100 by issuing a request in its internal PCI bus address space to the bus/memory interface device 106 where the request is translated to a corresponding address within the address space for the host PCI bus 102. Conventional PCI bridges have performed address translation.

The translation task is performed by the bus/memory interface device 106 using a system of internal programmable translation registers. The translation registers may be programmed on a per access basis by any device involved in a particular transaction. This allows all translations to occur between differing address spaces, dynamically, at a run-time level. For example, a first transaction may be initiated by a device instructing the bus/memory interface device 106 to configure its translation registers in a certain manner to allow a first translation between a first set of address spaces. The translation for that particular transaction is performed according to that configuration. A second transaction which requires translation between a second set of address spaces, different from the first set, is initiated when the requesting device instructs the bus/memory interface device 106 to reconfigure the translation registers to allow for the second transaction. In this way, a run-time change in communications among various bus interfaces is handled by dynamically reconfiguring the translation registers in the appropriate manner. Dynamic reconfiguration will be discussed below in more detail.

Here a memory storage device 104 is provided as a third interface to the bus/memory interface device 106. Here again, the bus/memory interface device 106 operates in either a bridge mode, merely passing transactions directly to the memory device 104 over the memory bus 130, or in a non-bridge or 120 mode, when requests from either the host PCI bus 102 or the internal PCI bus 108 are translated into the memory space of the memory device 104. The memory device 104 may be used either for cache memory operations and/or for RAID memory operations. While PCI I/O cycles are forwarded from the host PCI bus 102 to the internal PCI bus 108 for the bridge mode, PCI I/O cycles are not claimed by the internal PCI bus 108 in the non-bridge mode. Instead, a PCI I/O in the bus/memory interface device 106 window is opened so that the Host Processor 100 can communicate with the local processor 110.

Providing cache memory off of the bus/memory interface device 106 allows for efficient internal bus utilization through increased cache bandwidth, simultaneous host PCI bus and internal PCI bus memory operations and optimized control of bus performance. In addition, both RAID and cache operations share the same memory.

The bus/memory interface device 106 is therefore capable of operating between any number of bus interfaces. Furthermore, the bus/memory interface device 106 performs the translation function in a multi-directional manner. Therefore any request originating from any interface may be dynamically translated to the appropriate address within the address space for any other destination bus interface.

Any number of bus/memory interface devices 106 and the accompanying memory device 104 may be included in a system to create an external array architecture. The advantages of multiple bus interface devices include considerably increased cache capacity, thereby increasing memory bandwidth and increased data throughput via multiple data passages. The bus/memory interface device 106 in such a multi-device architecture provides automatic routing of command or data information among and between the various communication devices and memory via pre-specified address ranges.

Figure 2:
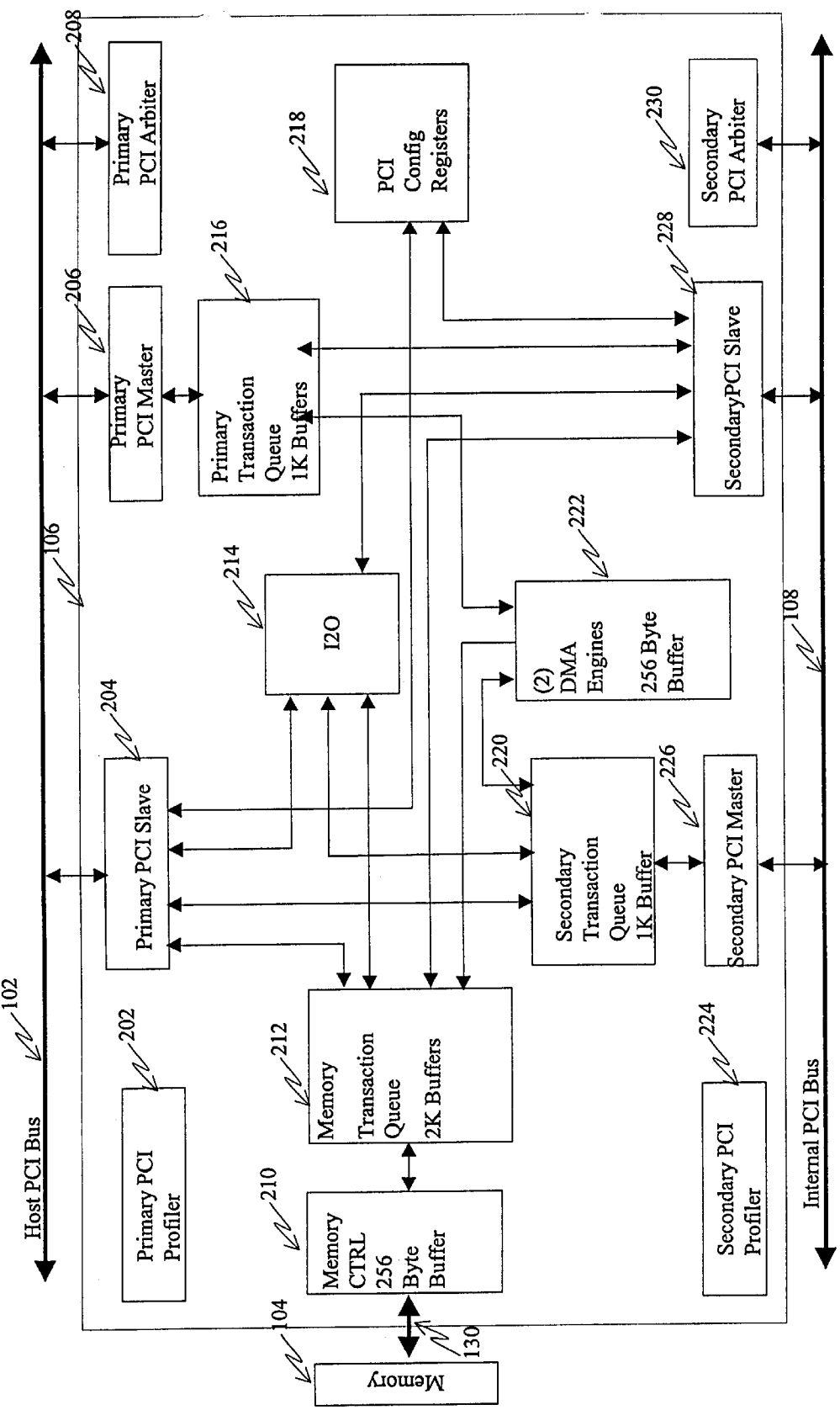
FIG. 2 is a block diagram of the internal components of the bus interface device of FIG. 1 in accordance with present invention.

Referring now to FIG. 2, a more detailed block diagram of the bus/memory interface device 106 is shown. The bus/memory interface device 106 connects to three external interfaces: the Host PCI Bus 102, the Secondary PCI Bus 108 and the Memory Bus 130. Each of the bus interfaces 102, 108 and 130 represents a different address space for the bus/memory interface device 106. The two DMA Engines 222 and the I2O control block 214 reference each bus interface as independent memory maps. Each memory space is encoded within the data structures of the DMA Engines 222 and then specified to the I2O Control Block 214 via configuration registers within the set of PCI Configuration Registers 218.

The two DMA Engines 222 are used for the automatic transfer of data for caching operations and for high speed execution of RAID operations, for example XOR functions. Each engine is capable of moving data among the three memory spaces for the host PCI bus 102, the secondary PCI bus 108 and the memory bus 130. To carry out the task of moving data between the memory spaces, the two DMA Engines 222 interface with three Transaction Queues, each transaction queue associated with one of the three bus interfaces. Therefore, the DMA Engines 222 interface with the host PCI bus 102 via the host PCI transaction queue 216. The DMA Engines 222 interface with the internal or secondary PCI bus 108 via the secondary PCI transaction queue 220. Finally, the DMA Engines 222 interface with the Memory bus 130 via the Memory transaction queue 212.

The data structures for each of the three memory maps which are encoded within the DMA Engines 222 are also utilized by the I2O Control Block 214. The I2O Control Block 214 provides a means for the host Processor 100, the Internal Processor 110 or other input/output processor (IOP) located on the Secondary PCI bus 108 to communicate by passing inbound and outbound messages in message frames The I2O Control Block 214 supports the industry standard interface defined in the Intelligent I/O Architecture (I2O) Specification, v 1.5, which is hereby incorporated by reference as if set forth in its entirety. Like the DMA Engines 222, the I2O Control Block 214 also interfaces with each of the three Transaction Queues 212, 216 and 220 to provide communication among and between the Host PCI Bus 102, the Secondary PCI Bus 108 and the Memory Bus 130. The I2O Control Block 214 operates in one of two modes: push and pull. In the I2O push model, the Host processor 100 writes a message frame to be communicated directly into the IOP's local memory. In the I2O pull model, the Host processor 100 writes the message frame to be communicated into host memory and allows the bus/memory interface device's 106 DMA Engines 222 to copy the message frame from host memory to the IOP memory. The I2O Control Block 214 is further connected to the Host PCI Bus 102 and the Secondary PCI bus 108 via the PCI Staves 204 and 228, respectively.

The PCI Slaves 204 and 228 provide access gateways among the Host PCI Bus 102 and the secondary PCI Bus 108 as well as to the Transaction Queues 212, 216 and 220 of the other interfaces. The PCI Slaves 204 and 228 also conduct priority decoding of transactions having conflicting address ranges.

The PCI master devices 206 and 226 provide the primary PCI functions for the bus/memory interface device 106 and are effectively compliant with the 2.1 revision of the PCI Specification. PCI Masters 206 and 226 control all transfers to their respective bus. Each PCI Master communicates with its associated transaction queue to determine the timing of the data transfers. Specifically, the Host PCI Master 206 requests control of the Host PCI Bus 102 when the appropriate amount of data is available in the Host PCI Transaction Queue 216. Likewise the Secondary PCI Master 226 requests control of the Secondary PCI Bus 108 when the Secondary PCI Transaction Queue 220 contains the appropriate amount of data. Each PCI Master is likewise capable of maintaining cache-line boundaries for read operations and each PCI slave is capable of maintaining cache-line boundaries for write operations. Maintaining cache-line boundaries for all transactions optimizes bus utilization by the bus/memory interface device 106.

As described above, the Transaction Queues 212, 216 and 220 provide the bridging mechanism between the different bus interfaces. There are three Transaction Queues, each dedicated to one of the three bus interfaces. The Host Transaction Queue 216 bridges transactions and operations to the Host PCI Master 206 onto the Host PCI Bus 102. The Secondary PCI Transaction Queue 220 bridges transactions to the Secondary PCI Master 226 onto the secondary PCI Bus 108. Finally, the Memory Transaction Queue 212 bridges memory accesses to the Memory Controller 210 and the SDRAM Memory 104. Certain of the Transaction Queues also communicate directly between the two PCI Slaves 204 and 228, the I2O control block 214 and the two DMA Engines 222.

In carrying out its function of bridging each of the bus interfaces, the Transaction Queues perform various subfunctions. First, all PCI master operations can be initiated by the associated transaction queue. The appropriate transaction queue sends a start pulse and all necessary transaction information in order to enable the PCI master to initiate a transaction. In addition, the Transaction Queues perform conflict resolutions among conflicting access requests. Each respective transaction queue determines which requesting source has access using a predetermined priority scheme. A higher priority request is given immediate access to the queue while lower priority request are held and retried for later acceptance. The Transaction Queues are also capable of determining how much data to pre-fetch for certain types of accesses from system devices which have known characteristics. Finally, the memory transaction queue 212 controls memory access requests to and from the SDRAM 104 by sending read and/or write instructions for the memory controller 210 to execute.

The PCI Profilers 202 and 224 are used to determine the amount of data that the transaction queue should pre-fetch for certain transactions on a per device basis. The transaction queue receives a selected profile for each transaction from its associated profiler.

The primary function of the Memory Controller 210 is to service memory requests from the Memory Transaction Queue 212. Specifically, the Memory Controller 210 translates instructions from the Memory Transaction Queue 212 into the proper format of read and/or write requests. The bus/memory interface device 106 supports all SDRAM architectures of varying density and speed by having registers define the number of row and column address bits and certain delay parameters.

Implemented within the bus/memory interface device 106 can be a data protection scheme for RAID (redundant array of inexpensive drives) systems which provides a technique of allowing the system to experience multi-drive failures. Specifically, a multiplier is provided in connection with the Memory Transaction Queue 212 to extend the capabilities of typical RAID operations. RAID operations using a multiplier are described in detail in a commonly-assigned U.S. Patent Application, entitled MEMORY INTERFACE CONTROLLER FOR DATUM RAID OPERATIONS WITH A DATUM MULTIPLIER, previously incorporated herein by reference.

All transactions over the Host PCI Bus 102 and the Secondary PCI Bus 108 communicating with the bus/memory interface device 106 are prioritized according to an arbitration algorithm compliant with the PCI Specification, 2.1 revision. The arbitration algorithm is controlled in the Host PCI Arbiter 208 and the Secondary PCI Arbiter 230.

The architectures shown in FIGS. 1 and 2 and described herein are merely illustrative and not exhaustive. It should be noted that any number of different specific architectures may be employed without departing from the present invention.

The bus/memory interface device 106 can be used for internal controller or external controller applications. For the internal controller application, the bus/memory interface device 106 is used as a bridge between a host PCI bus and an internal PCI bus. With the bus/memory interface device 106, data can be routed from an internal I/O controller coupled to a disk drive to an internal PCI bus, from the internal PCI bus to a cache memory, and from the cache memory to a host PCI bus which communicates with a host. The internal I/O controller can for example be a Fibre Channel controller or a SCSI controller. While in an internal controller application the bus/memory interface device 106 provides bridging functions to a host, in an external array controller application the bus/memory interface device 106 can provide other bridging functions such as bridging to a variety of I/O controllers and even to other bus/memory interface devices 106. Alternatively, in an external tape controller application, the bus/memory interface device 106 can be used primarily for interfacing a tape controller to a cache memory in connection with error code correction. A variety of internal and external controller applications using the bus/memory interface device 106 may be employed without departing from the present invention.

Figure 3:
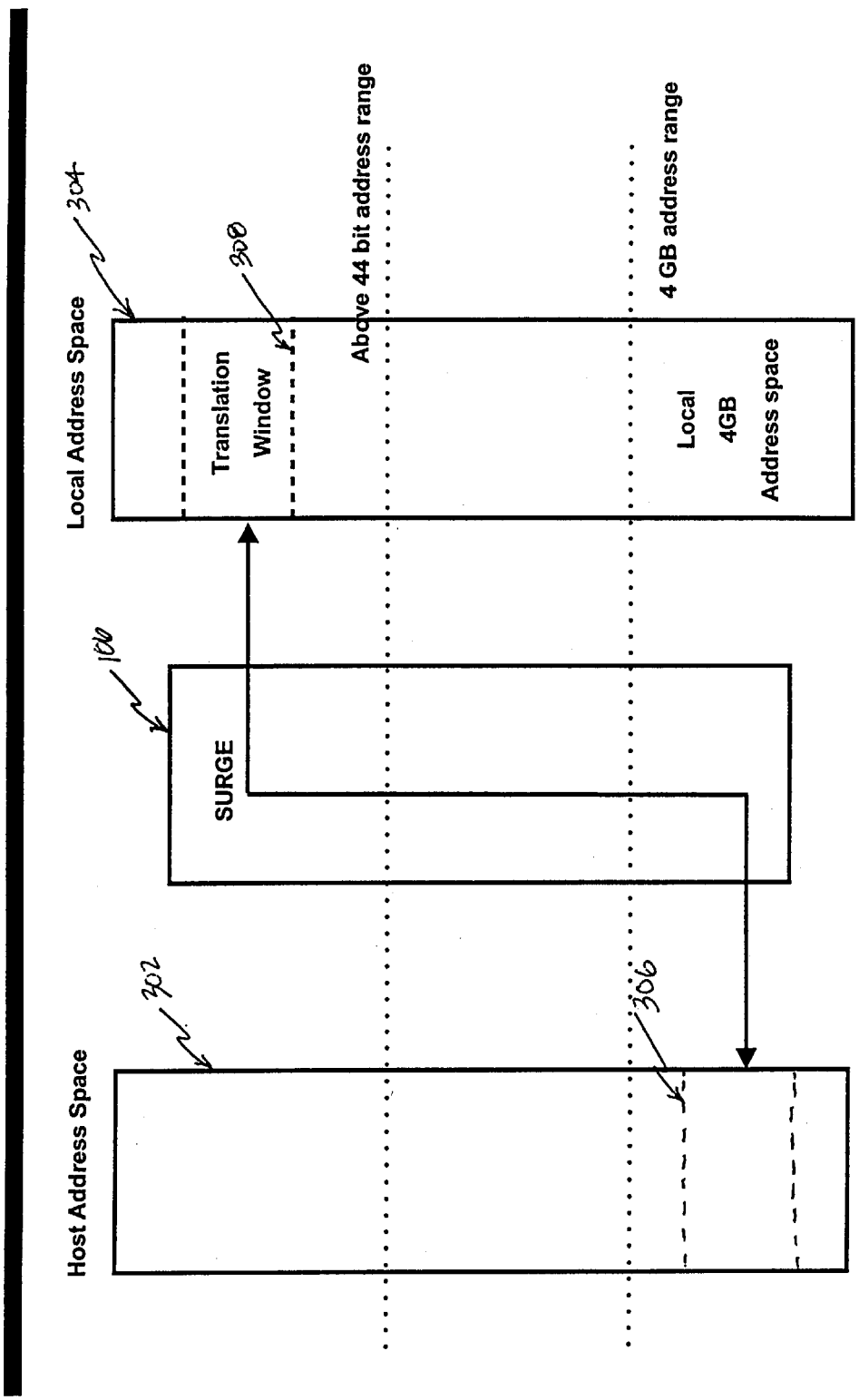
FIG. 3 is a pictorial for address translation of the bus interface device of FIG. 2.

Turning now to FIG. 3, illustrated is one embodiment of address translation between at least two bus interfaces. At one interface, a host address space 302 is established, such as a host PCI address space associated with the host PCI bus 102. At a second interface, a local address space 304, for example is also established. The local address space 304 may be associated with an interface to a second local bus, for example an internal PCI bus 108, or may be associated with a different interface such as memory 104. It should be understood by persons skilled in the art that an address space may be associated with any type of interface in addition to the specific examples given. The host address space 302 also contains a translation window 306 within which the bridge device 106, or Surge, recognizes a translation requirement, claims the transaction and translates according to its translation algorithm. A bus transaction originating from the internal PCI bus 108 initiates a translation when the incoming transaction falls within the translation window set by the PCI configuration registers 218, discussed below. When the transaction hits the translation window, Surge 106 accepts the transaction and, if translation is enabled, performs the translation to the destination interface. When a transaction is initiated from the secondary bus or internal PCI bus 108, the secondary PCI slave 204 communicates with the PCI configuration registers 218 to determine whether the incoming address hits within the translation window 308 defined by the configuration registers 218. Once the translation is completed, the information is passed to the primary transaction queue 216 which coordinates the operation and eventually passes it to the primary PCI master 206 to then perform the write cycle on the opposite side of Surge 106 as if it were a typical PCI-to-PCI operation. In the opposite direction, a transaction initiated from the primary or host PCI bus 102 is decoded by the primary PCI slave 204. If within the translation window 306 defined by the configuration registers 218, the primary PCI slave 204 initiates translation. The translated address is passed to the secondary transaction queue 220 and then to the secondary PCI master 226 where it is presented to the internal PCI bus 108. Translation, in effect, causes the received address/data at one location within a source address space to be presented from the source interface to the destination interface at a different location within the destination address space.

Translation may be needed for any number of reasons. For example, conflicts may exist between address spaces of a local CPU and a host CPU. Essentially, a local CPU may have allocated portions of its address space for purposes other than transacting with the host CPU. As such, under normal bridge operation, the transition occurring in the host address space, when received by the local CPU, may cause a conflict, requiring inefficient conflict resolution. According to a disclosed embodiment, the local CPU is able to program the translation registers in the configuration registers 218, discussed in more detail below, to have the transaction sent within a portion of local address space that is preferred by the local CPU. Another type of conflict situation exists where the local address space simply doesn't exist for a corresponding larger host address space. In this instance, translation is necessary to the transaction. In other words, where a conflict exists between an address for the local CPU or the local PCI bus 108 and the host PCI bus 102, the slave devices 204 or 228 translate the address at the receiving interface into a different address in the destination interface. Additionally, translation across Surge 106 is operational in both directions, as discussed above, and may be programmed by any master on any interface.

Likewise, the translation registers are programmable to allow for multiple interfaces and multiple different address spaces. Specifically, any master device during runtime is able to program the translation registers to provide for preferred address space utilization. In addition, programming of the translation registers may lie performed dynamically within the various bus operations or upon system configuration. Runtime register programming is performed according to typical processor/register communication protocol and is well understood in the industry.

Figure 4:
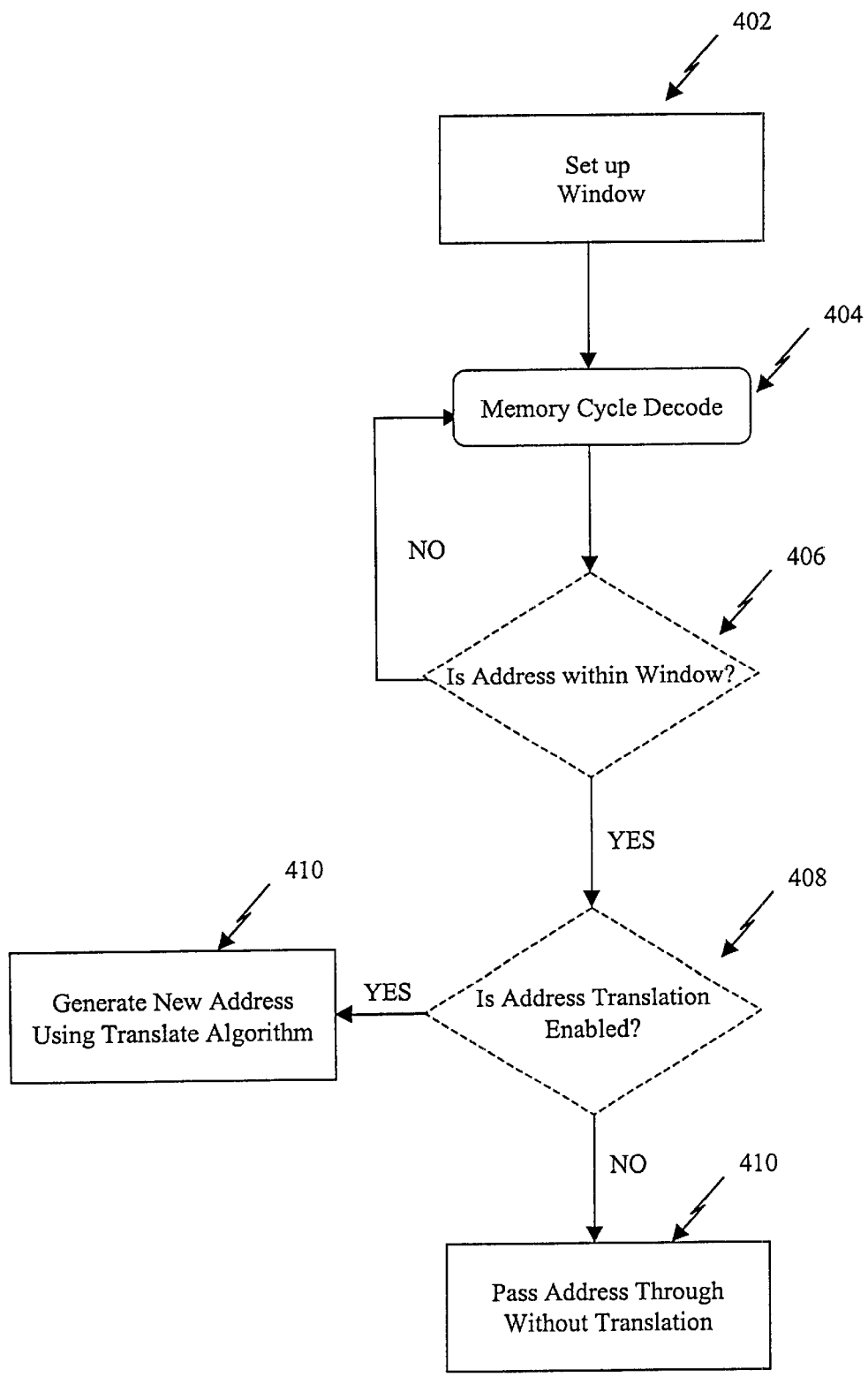
FIG. 4 is a flow chart of an exemplary address translation using dynamic remapping of configuration registers.

Turning now to FIG. 4, shown is an exemplary flow diagram for implementing an embodiment of the disclosed address translation. In step 402, an address translation window is established. The address translation window establishes an address range within which a transaction will be claimed by the appropriate PCI slave 204 or 228, as discussed above, and, if enabled, translated to a different location in a destination address space The translation window may be set either upon initial configuration or dynamically by any initiating master device during runtime. A set of configuration registers 218 within Surge 106 is used to configure the translation window.

Among the registers, as part of the set of configuration registers 218, are included base address registers, size registers and limit registers, according to one embodiment. Base address registers define the starting point of the translation windows 306 and 308. A corresponding size register or, alternatively, a limit register then identifies the amount of space extending from the base address, thereby establishing the translation window 306 or 308. In other words, these types of registers define the size or boundaries for the translation window 306 or 308. Size and limit registers provide different mechanisms to determine the portion of the incoming address that should not be translated but instead merely passed unchanged to the destination interface. Availability of translation utilizing either size or limit registers provide additional flexibility. For example, according to one embodiment, size registers are used when a transaction maybe performed within an address space of a size that is a power of two. Alternatively, where more granularity is required, limit register may be used to establish address spaced not limited to power of two sizes. The specific differences between translations utilizing size registers and translations utilizing limit registers are discussed in detail in connection with FIGS. 7 and 8. FIG. 6 lists the various translation window sizes as represented by the value of the size register. These configuration registers 218 will be discussed in more detail below.

Continuing at step 404, a bus cycle, for example a memory cycle, is decoded from the initiating interface. If the decoded address falls within the translation window established in step 402, Surge 106 claims the transaction. According to an embodiment, the entire address is compared to the values of the translation registers to determine if the address is within the programmed translation range. Another implementation may alternatively only read the highest order bits of the incoming address to perform the comparison. Certain transaction efficiencies may be achieved by such a partial need.

In step 408, Surge 106 then detects whether address translation is enabled. According to an embodiment, the address translation may be enabled and disabled by selectively setting a bit within a translation configuration register. If address translation is not enabled, the received address is simply passed through Surge 106 without translation. In this mode, Surge 106 mimics the operation of a typical bridge device, for example a PCI-to-PCI bridge. However, if address translation is enabled, the appropriate slave 204 or 228 initiates the address translation and generates a new address to present to the destination interface. Here again, Surge 106 is flexible in that an incoming bus cycle may be decoded at any interface and thereafter translated to any address space at a different interface, as programmed within the configuration registers 218.

Turning now to FIG. 5, shown is a register map of the various configuration resisters for address translation. A combination of base address registers and size, limit and translation registers are utilized in the translation function. The translation registers, S_PCI_TADR, translate an address from the initiating interface to a destination interface, based on the received address, the value in the base address register for the corresponding interface, S_PCI_BASE in this example, and the size or, alternatively the limit registers, S_PCI_SIZE or S_PCI_LIM respectively. By allowing the configuration registers to be dynamically reprogrammed during bus operations, the total number of required translation registers is significantly reduced while providing substantial flexibility in translating to any preferred address of a given bus master. In essence, to satisfy every conflict between multiple bus interfaces, without the ability to dynamically reprogram the registers, an effectively infinite number of translation registers would be required In accordance with disclosed techniques, a fewer number of translation registers are required based on the flexibility provided by the reprogrammability of the registers during runtime.

According to one embodiment, the configuration registers 218 consist of four sets of registers. Each grouping of registers may be reprogrammed by a given bus master during bus transactions. For example, the P_PCI_BASE1, P_PCI_LIM_1 and P_PCI_TADR_1 are grouped together to accomplish a translation of forward cycles from the primary interface, the host PCI bus 102 for example, to the secondary interface, the internal PCI bus 108 for example. Another similar grouping of configuration registers 218 decodes forward bus cycles from the secondary interface to the primary interface. These secondary interface-to-primary interface registers are indicated with the "S" suffix, for example S_PCI_BASE_1. In addition, a similar set of memory-to-secondary, secondary-to-memory, primary-to-memory and memory-to-primary register groupings are provided for memory cycles to and from a memory device such as memory 104, for example S_DRAM_BASE1.

Figure 7B:
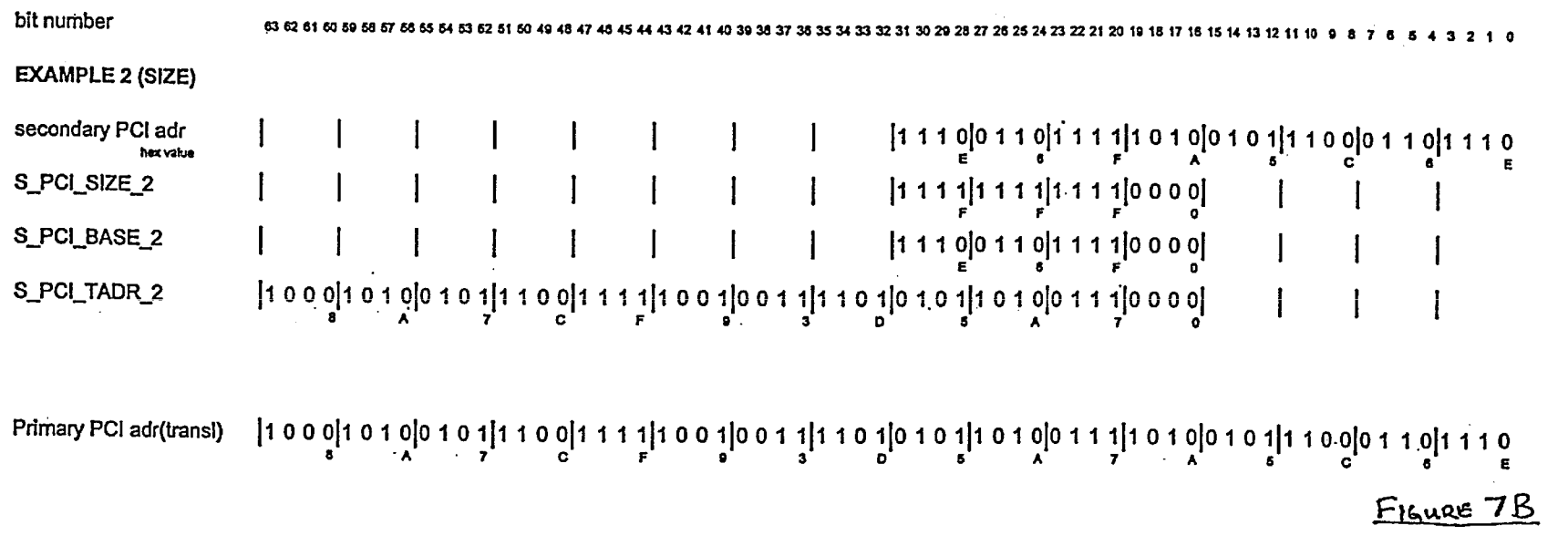

Turning now to FIGS. 7A, 7B, 8A and 8B, shown are examples of address translation according to a disclosed embodiment. As indicated, address translation may be performed using either a size register or a limit register. FIGS. 7A and 7B provide an example utilizing a size register, while FIGS. 8A and 8B utilize a limit register for address translation. Turning to FIG. 7A, the example illustrates translation of a transaction initiated on the secondary interface side of Surge 106, the internal PCI bus 108 for example. To translate across to the host PCI bus 102 interface, for example, the secondary base register, S_PCI_BASE_2 is used in conjunction with the appropriate size register, S_PCI_SIZE_2. These two registers set up a window on the internal PCI bus 108 interface such that when a secondary PCI bus address falls within that window, Surge 106 claims the transaction. If translation is enabled, Surge 106 will translate according to the example of FIGS. 7A and 7B. If address translation is disabled, Surge 106 will merely pass the address from the secondary PCI bus 108 to the host PCI bus 102.

Thus, in the example, the received secondary PCI bus address of E6FA 5C6Eh is translated to the translated address of 8A7C F93D 5A7A 5C6Eh in the primary PCI address space. FIG. 7B illustrates the bit values in the respective registers identified in the example of FIG. 7A. Also included in FIG. 7B, under each four-bit binary value, is the associated hexadecimal value also indicated in FIG. 7A. Thus, a bus transaction originating from the secondary PCI bus 108 of E6FA 5C6Eh is translated to a different location in the primary interface associated with the host PCI bus 102, as 8A7C F93D 5A7A 5C6Eh. In this example, the group of registers utilized are S_PCI_SIZE_2, S_PCI_BASE_2 and S_PCI_TADR_2.

The combination of the S_PCI_SIZE_2 and S_PCI_BASE_2 registers establishes the translation window on the internal PCI bus 108 interface. The secondary bus address, E6FA 5C6Eh, thus, falls within the window configured by the base and size registers. In this example, the S_PCI_SIZE_2 register is set to a value of FFF0h establishing a translation window of one megabyte, see FIG. 6. Thus, the window location is one megabyte beginning at E6F0h. As such, Surge 106 claims the transaction and initiates its translation algorithm as described in FIG. 4. Bits [15:4] of the size register correspond to bits [31:20] in the S_PCI_BASE_2 register and are used to determine if the corresponding bits in the S_PCI_BASE_2 register are writeable, or translated. Functionally, the size register is used such that a one, or true, in a bit position allows a corresponding bit in the base address register to be written. A value of 0000h in this register disables decoding by the primary PCI slave 204. Thus, the size register in effect identifies those bits within the address received from the initiating interface to translate to form the translated address.

In this example, the value of the size register indicates that bits [31:20] of the secondary PCI address require translation while bits [19:0] of the secondary PCI address are merely passed through Surge 106 as bits [19:0] of the translated address on the primary PCI interface. Thus, the lower 20 bits of the received address are passed on as the lower 20 bits of the translated address. The rest of the bits from the secondary PCI address are translated or not translated based on the size of the address range programmed for each base address and represented in the size register. For instance, in this example, as the size of the address range is one megabyte, only the lower 20 bits (20 bits=1 megabyte) are passed on and the remaining bits are translated. If the size of the address range is four megabytes (a value of FFF8h in the S_PCI_SIZE_2 register), then only the lower 22 bits (22 bits=4 megabytes) are passed on and the remaining bits are translated.

Once the translation algorithm determines which bits of the secondary PCI address are to be translated, the translation register S_PCI_TADR_2 is read to determine the value of the bits corresponding to the bits to be replaced in the secondary PCI address. Specifically, the bits of the secondary PCI address to be translated are replaced by the corresponding bits in the corresponding translation register. Thus, the translated primary PCI address consists of non-translated bits [19:0] of the original secondary PCI address and the translated bits [63:20] taken from the S_PCI_TADR_2 register. Referring back to FIG. 7A, the lower bit values of the secondary PCI address A 5C6Eh are passed untranslated to the destination interface. Beginning with the bit location following the last bit that is not translated, the translation address from the translation register is, in essence, added to form the translated address including the non-translated lower bits, resulting in the exemplary value of 8A7C F93D 5A7A 5C6Eh.

Thus, returning to FIG. 3, the incoming address from a host address space that is below the four gigabyte (GB) address range, indicated by a dotted line, first falls within the translation window set by the base and size registers and is then translated to a different location in a second address space. Specifically, according to the example shown in FIG. 3, the resulting address is translated to an address location above the 44 bit address range indicated by a dotted line and within the translation window 308. This also corresponds to the example of FIGS. 7A and 7B illustrating a translation into an address space above a 64 bit address range from an address range below four gigabytes.

Turning now to FIGS. 8A and 8B, shown is another example of address translation, but using a limit register instead of a size register. The translation algorithm uses the limit register in a different manner than the example above utilizing the size register. In essence, the limit register is examined on a bit-by-bit basis beginning with its highest order bit and proceeding to its lowest order bit. From the highest order bit a comparison proceeds down towards lower bits until a bit is found that does not match the corresponding bit in the base register S_PCI_BASE_3. At that point, Surge 106 determines that all lower order bits from the non-matching bit, including the non-matching bit, should not be translated. As such, in this example, beginning at bit [63] of the limit register, the first non-matching bit when compared to the base register S_PCI_BASE_3 register is bit [23]. Thus, bits [23:0] of the original secondary PCI address are passed through Surge 106 without translation to the destination interface. The bits of the secondary PCI address above the non-matching bit are then replaced with the corresponding bits from the translation register S_PCI TADR_3. The resulting translated primary PCI address thus consists of bit values from S_PCI_TADR_3 [63:24] along with the original value of the secondary PCI address in bits [23:0].

Thus, by programming the various configuration registers, a bus master can control a transaction and where within its address space a transaction occurs. For example, a receiving CPU in host address space may not want to deal with a transaction occurring in a lower address range on the initiating interface. Specifically, the processor on the host address side may have a limited address and might want to stay out of a certain address range. In that case, the host processor would make the decision and program the appropriate registers to tell Surge 106 where the host processor wants incoming transactions placed within its address space. Further, the translation registers to be programmed during runtime. Dynamic reprogramming allows a reduced number of translation registers and increased flexibility for unexpected conflicts among multiple devices in multiple address spaces.

The same process applies for transactions to and from the memory controller interface. In essence, the memory interface is a third port or interface on Surge 106. Memory may be stored at one location on the host side and the local processor may want to get to the same memory, but may not want the memory information located, as identified above, where the host processor happened to place the memory. As such, the local processor can place the information somewhere else within the local address space, and still translate down through Surge 106 to get the same memory out of the memory port. Thus, it should be understood that Surge 106 allows dynamic re-mapping of translation registers to translate among any number of different interfaces. Specifically, Surge 106 allows various controllers at different interfaces to reprogram the Surge translation registers. This is different than normal PCI-to-PCI bridge operation at least in that typical PCI capability provides programmability from only the host controller interface.

The foregoing disclosure and description of various embodiments are illustrative and explanatory thereof, and various changes in the architecture, controllers, busses, registers, interfaces, addressing, commands, circuitry, components and order of process steps, as well as in the details of the illustrated software and hardware and construction and method of operation may be made without departing from the scope of the invention.

What is claimed is:

1. A method for communicating between buses, the method comprising:
   programming a set of translation registers defining a translation address window;
   receiving information in a first address space from a first bus;
   translating the received information into a second address space of a second bus if the received information is within the translation address window; and
   transmitting the translated address or data information over the second bus,
   wherein the step of programming a set of translation registers can be performed dynamically on a per-access basis by any device involved in a particular transaction.

2. The method of claim 1, further comprising the step of:
   recursively repeating said receiving, translating and transmitting steps for information between any number of different buses.

3. The method of claim 1, wherein the set of translation registers comprise a minimum set of reprogrammable translation registers.

4. The method of claim 1, the translating step is performed according to a translation algorithm comprising the steps of:
   comparing a value of one of the set of translation registers with the received address to determine a portion of the received information to be translated; and
   replacing the portion of the received information to be translated with a value of a second one of the set of translation registers, forming a translated information.

5. The method of claim 4, wherein a portion of the received information is determined not to be translated for bits of the received information that correspond to bits in a size register that have a predetermined value.

6. The method of claim 4, wherein the portion of the received information to be translated includes bits of the received information that correspond to bits in a limit register that match corresponding bits in a base address register.

7. The method of claim 1, wherein only a portion of the received information is translated, the remaining portion of the received information being transmitted without translation.

8. The method of claim 1, wherein the step of translating is selectively enabled by a value of a bit in a register of the bus interface device.

9. The method of claim 1, wherein the received information is in a first address space associated with the first bus and the translated information is in a second address space associated with the second bus.

10. The method of claim 1, wherein the received information and the translated information includes both address information and data information.

11. A bus interface device for communication between multiple bus interfaces, comprising:
    a first peripheral bus interface;
    a second peripheral bus interface;
    a first address space associated with the first peripheral bus interface;
    a second address space associated with the second peripheral bus interface; and
    translation registers to translate information from the first address space to the second address space, dynamically programmable on a per-access basis by any device involved in a particular transaction.

12. The bus interface device of claim 11, wherein the translation registers translates other information from the second address space to the first address space.

13. The bus interface device of claim 11, wherein the translation registers translates the information from the first address space to the second address space if the information is within a translation window defined by the translation registers.

14. The bus interface device of claim 13, wherein the translation registers comprise a base address register to define a beginning of the translation window.

15. The bus interface device of claim 13, wherein the translation registers comprise a size register to define a size of the translation window.

16. The bus interface device of claim 13, wherein the translation registers comprise a limit register to define a boundary of the translation window.

17. The bus interface device of claim 11, wherein the translation registers are programmable by an external bus masters.

18. The bus interface device of claim 11, wherein the translation registers are dynamically programmed within transaction cycles of the bus interface device.

19. The bus interface device of claim 11, wherein translated information is determined by replacing a portion of the information with a value of one of the translation registers.

20. The bus interface device of claim 19, wherein the portion of the information to be translated is determined based on one of a set of translation registers of the bus interface device.

21. The bus interface device of claim 11, wherein bus interface device translation is selectively enabled by a value of a bit in a register.

22. The bus interface device of claim 11, wherein the information includes both address information and data information.

23. A bus interface device for communication between multiple bus interfaces, comprising:
    a first peripheral bus interface;
    a second peripheral bus interface;
    a first address space associated with the first peripheral bus interface;
    a second address space associated with the second peripheral bus interface; and
    a means for dynamically translating information from the first address space to the second address space, dynamically programmable on a per-access basis by any device involved in a particular transaction.

24. The bus interface device of claim 23, further comprising:
    a means for dynamically translating information from the second address space to the first address space.

* * * * *